July 7, 1959  A. M. BRENNEKE  2,893,797
PISTON RING ASSEMBLY
Filed Aug. 8, 1956
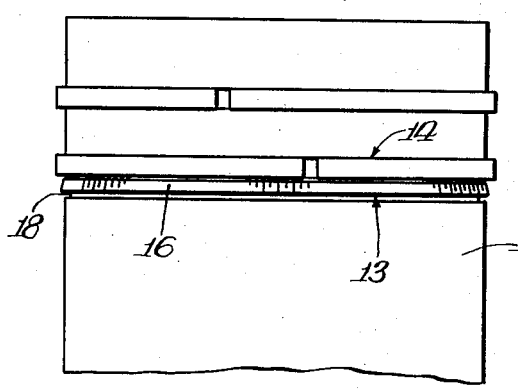
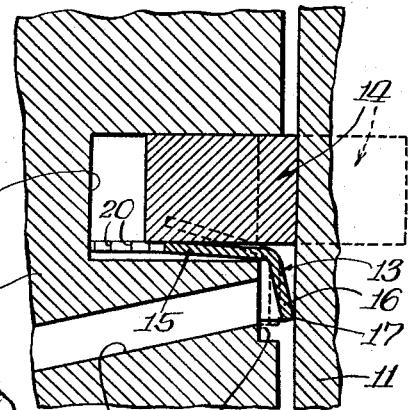
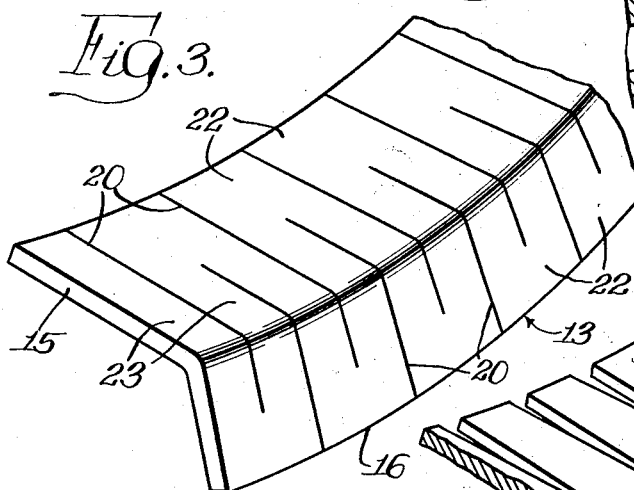
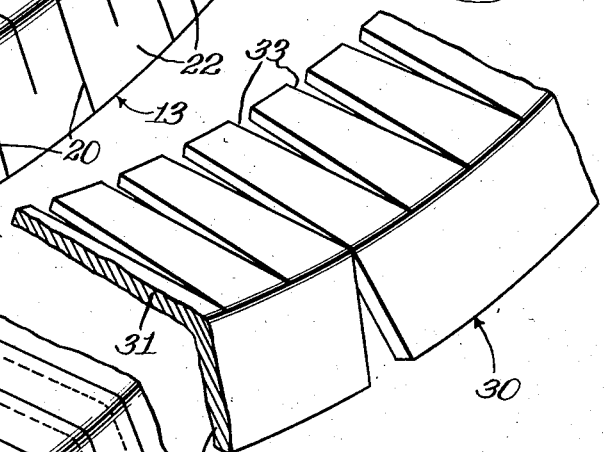
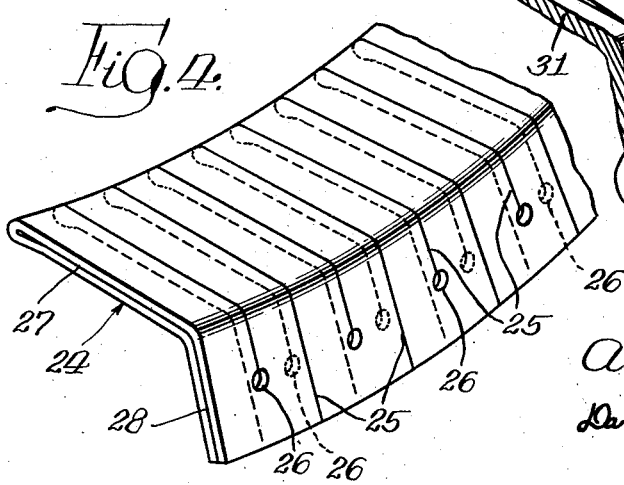
INVENTOR.
Arthur M. Brenneke,
BY
Darius, Lindsey, Hidden & Noyes
Attys.

United States Patent Office 2,893,797
Patented July 7, 1959

2,893,797

PISTON RING ASSEMBLY

Arthur M. Brenneke, Hagerstown, Ind., assignor to Perfect Circle Corporation, Hagerstown, Ind., a corporation of Indiana Application August 8, 1956, Serial No. 602,776

12 Claims. (Cl. 309—44)

The invention relates generally to piston rings and more particularly to a piston ring assembly for an internal combustion engine.

In the usual practice in internal combustion engines, two or more piston rings are provided for each piston. The upper ring or rings, or those nearer the combustion space of the cylinder, are compression rings while the lower ring, or the ring farther from the combustion space, is termed an oil ring for removing excess oil from the cylinder wall, leaving only sufficient oil thereon to properly lubricate the compression ring or rings. Heretofore, each ring is usually positioned in its own groove in the piston with the grooves axially spaced from each other.

The general object of the present invention is to provide a novel piston and combined compression and oil ring assembly therefor.

Another object is to provide a novel combined compression and oil ring assembly adapted to be mounted in a single groove in the piston.

A further object is to provide a piston ring assembly having an oil ring member held in operative relation with the cylinder wall in a novel manner.

Still another object is to provide a novel oil ring member for a piston ring assembly.

Other objects and advantages will become apparent from the following description taken in connection with the accompanying drawing, in which:

Fig. 1 is a fragmentary view of a piston provided with a piston ring assembly embodying the features of the invention;

Fig. 2 is a radial sectional view of the piston ring assembly and showing it mounted in a groove in a piston and in contact with the cylinder wall;

Fig. 3 is a fragmentary perspective view of a part of the ring assembly;

Fig. 4 is a fragmentary perspective view similar to Fig. 3 but showing a modified form; and Fig. 5 is a fragmentary perspective view similar to Figs. 3 and 4 but showing another modified form.

As heretofore mentioned, a compression ring for a piston of an internal combustion engine is usually mounted in a groove which is axially spaced from the groove adapted to receive an oil control ring. A ring assembly embodying the features of the invention is adapted to be mounted in a single groove in the piston and functions both as a compression ring and an oil control ring. Thus, the assembly comprises a compression ring member and an oil ring member coacting with each other in a novel manner. The oil ring member comprises generally a flange portion of upwardly dished form adapted to extend into the groove of the piston, and a skirt portion adapted to engage the cylinder wall to scrape oil therefrom, and may be radially expansible but is shown as circumferentially expansible. The compression ring member is similar to compression rings heretofore used and is shown as having a rectangular cross-section, but it may be of other cross-sectional form or may be circumferentially expansible. The axial dimension of the compression ring member, however, is such that when it is inserted into the groove along with the flange portion of the oil ring member, it partially flattens said flange portion and thereby causes the skirt portion of the oil ring member to flare outwardly into operative engagement with the cylinder wall. If it is desired to utilize the assembly merely as an oil control means, without the compression ring feature, the flange portion of the oil ring member may be partially flattened to cause the skirt to flare, by means of a simple ring member placed in the groove but of smaller diameter than the cylinder.

In the drawing I have shown a piston 10 and in Fig. 2 the piston is shown as mounted in a cylinder fragmentarily shown at 11. The piston 10 is provided with a groove to receive the piston ring assembly, the groove for its major or first portion, indicated at 12, being shown as rectangular in cross section as is common for a piston ring groove. Mounted within the groove is the piston ring assembly of the invention comprising an oil ring member indicated generally at 13 and a compression ring member indicated generally at 14. The oil ring member 13 comprises a flange portion 15 which is upwardly dished towards its inner periphery and is adapted to extend inwardly in the groove portion 12. The oil ring member 13 also includes a skirt or second flange portion 16 adapted to extend downwardly and outwardly exteriorly of the piston 10 to present a scraping edge 17 adapted to engage the cylinder wall to scrape oil therefrom. To provide space for free action of the skirt portion 16 of the oil ring member, a second shallower groove portion 18 is cut in the periphery of the piston and extends downwardly from the major groove portion 12. A drain hole 19 extends from the groove portion 18 to return the oil scraped from the cylinder wall to the crank case of the engine.

The oil ring member 13 may be either radially or circumferentially expansible and in Figs. 1 and 3 is shown as circumferentially expansible. To this end, the oil ring member is made of a strip of sheet metal which is transversely slitted as at 20 alternately from opposite edges of the strip. The slits 20 in opposite edges of the strip overlap each other so that two rows of segments 22 and connecting web members 23 are formed. The strip is bent along a longitudinally extending line to form the flange portion 15 and the skirt portion 16 positioned at an angle to each other. The strip is then given an annular form and is stretched sufficiently to slightly open the slits 20. When the oil ring member 16 is placed in the groove portion 12, the ends thereof are in abutment so that the structure thereof is circumferentially expansible.

The compression ring member 14 is preferably made of cast iron and, as mentioned before, is shown as having a substantially rectangular cross section. However, the axial dimension of the compression ring member 14 is such that it will partially flatten the dished flange portion 15 of the oil ring member when the two are placed in the groove portion 12. To mount the ring assembly in the groove portion 12, the flange portion 15 of the oil ring member is first placed in the groove portion 12. The oil ring member at this time occupies the position shown in dotted lines in Fig. 2. The compression ring member 14 is then partially inserted into the groove, as shown in dotted lines in Fig. 2, and when compressed to its full line position for insertion into the cylinder, it partially flattens the dishing of the flange portion 15 of the oil ring member to the position shown in full lines in Fig. 2. Such flattening of the dishing of the flange portion 15 tends to swing the skirt portion 16 outwardly to cause it to flare into engagement with the cylinder wall.

If it is desired to have the ring assembly operate only as an oil control ring, the ring member 14 of course may be made of smaller diameter so that it does not contact the cylinder wall. In this case, however, the ring member 14 has a sufficient axial dimension so that when it is placed in the groove 12, it will partially flatten the flange portion 15 of the oil ring member.

With this construction, it will be noted that the oil ring member resiliently engages the compression ring member to hold the latter against the upper side of the groove. In turn, the oil ring member is resiliently held in cylinder-engaging position by a flaring action of the skirt portion 16 when the flange portion 15 is partially flattened by the compression ring member 14.

The modified construction of the oil ring member shown generally at 24 in Fig. 4 is also circumferentially expansible but is a double layer structure. Thus, the oil ring member 24 comprises a strip of sheet metal substantially twice as wide as the strip used for the form of Fig. 3. The strip is transversely slitted alternately in opposite edges of the strip, as indicated at 25, with the slits overlapping each other. The inner end of each slit is provided with a hole 26 to prevent the slit from tearing beyond the hole when in use. The strip is then folded upon itself along a line extending longitudinally of the strip to form the double layer structure. By such folding, the holes 26 in one layer are closed by the other layer. The double layer structure is thereafter bent along a longitudinally extending line and is formed into a ring having an upwardly dished flange portion 27 and a skirt portion 28. The structure of course is stretched sufficiently to slightly open the slits 25 to permit it to be compressed, with the ends of the strip in abutment, when placed on the piston. The structure of Fig. 4, of course, functions in substantially the same manner as the structure of Fig. 3 in connection with the ring member 14.

The modified form of oil ring member, indicated at 30 in Fig. 5, is of the radially expansible type and comprises a strip of sheet metal bent along a longitudinally extending line to form a flange portion 31 and a skirt portion 32. The flange portion 31 is upwardly dished and is adapted to be partially flattened when the compression ring member 14 is placed in the groove. To permit such flattening, the flange portion 31 is provided with a plurality of triangular slits 33 terminating at the outer periphery of the flange portion. The skirt portion 32, however, is unslitted. The ends of the strip abut each other at least at one point. While such abutment may be provided throughout the width of the strip, the abutment is shown as occurring only at the line of bending between the flange portion 31 and the skirt portion 32.

I claim:

1. A combined compression and oil ring assembly for use in a piston ring groove of a piston, comprising an oil ring member having two angularly related flanges, one flange being adapted to extend into the groove and tending to swing upwardly and the other flange extending downwardly, and a compression ring member adapted to be mounted in the groove to force said one flange downwardly and thereby swing said other flange outwardly for engaging the cylinder wall, said one flange being slitted to permit it to be readily forced downwardly by said compression ring member.

2. A combined compression and oil ring assembly for use in a piston ring groove of a piston, comprising an oil ring member having two angularly related flanges, one flange being adapted to extend into the groove and being upwardly dished and the other flange extending downwardly, and a compression ring member adapted to be mounted in the groove above said one flange to partially flatten the dishing thereof and thereby cause said other flange to flare outwardly to engage the cylinder wall, said one flange being slitted to permit such flattening thereof.

3. A combined compression and oil ring assembly according to claim 2, in which said oil ring member is circumferentially expansible.

4. A combined compression and oil ring assembly according to claim 2, in which said oil ring member is transversely slitted alternately in opposite edges thereof with the slits in one edge overlapping the slits in the other edge to render the oil ring member circumferentially expansible.

5. A combined compression and oil ring assembly according to claim 2, in which each of said flanges comprises a row of segments connected to the segments in the other flange by web members bent at an angle intermediate their ends.

6. An oil ring member for a piston ring assembly, comprising a dished flange adapted to extend into a groove in the piston, and a cylinder-engaging skirt portion extending from the outer periphery of said flange, said flange being radially slitted to permit it to be partially flattened, and said skirt portion being adapted to flare outwardly on such partial flattening of said flange.

7. An oil ring member for a piston ring assembly, comprising a dished flange adapted to extend into a groove in the piston, and a cylinder-engaging skirt portion extending from the outer periphery of the flange, said member being transversely slitted alternately in the inner and outer edges thereof for circumferential expansion, and said skirt portion being adapted to flare outwardly on partial flattening of said flange.

8. An oil ring member for a piston ring assembly, comprising a strip of sheet metal transversely slitted alternately in opposite edges with the slits in one edge overlapping the slits in the other edge to form two rows of segments connected by web members, the strip being bent at an angle intermediate the ends of the web members and being formed substantially into a circle to provide a dished flange portion and a skirt portion.

9. An oil ring member for a piston ring assembly, comprising a dished flange adapted to extend into a groove in the piston, and a cylinder-engaging skirt extending from the outer periphery of the flange portion at an angle thereto, the inner edge portion of said flange and the lower edge portion of said skirt each comprising a row of segments, the flange and skirt also including web members connecting the segments in one row with those in the other row.

10. An oil ring member for a piston ring assembly, comprising a strip of sheet metal transversely slitted alternately in opposite edges with the slits in one edge overlapping the slits in the other edge, the inner end of each slit being enlarged to form a termination hole to prevent tearing of the strip beyond the hole, the strip being folded upon itself throughout its length to form a double layer structure whereby the termination holes in each layer are closed by the other layer, said double layer structure being bent to provide a dished flange adapted to extend into a groove in the piston, and a cylinder-engaging skirt portion extending from the outer periphery of the flange, said skirt portion being adapted to flare outwardly on partial flattening of said flange.

11. An oil ring member for a piston ring assembly, comprising a dished flange adapted to extend into a groove in the piston and having a plurality of triangular slits formed therein with the slits terminating at the outer periphery of the flange, to permit the flange to be partially flattened, and a cylinder-engaging skirt portion extending from the outer periphery of said flange, said skirt portion being adapted to flare outwardly on such partial flattening of said flange.

12. An oil ring member according to claim 11, in which said skirt portion is unslitted, and the ring member comprises a strip of sheet metal having its ends in abutment.

References Cited in the file of this patent

FOREIGN PATENTS

| 123,351 | Great Britain | Dec. 24, 1917 |
| 593,392 | Great Britain | Oct. 15, 1947 |